United States Patent [19]
MacLeod

[11] Patent Number: 5,794,966
[45] Date of Patent: Aug. 18, 1998

[54] VEHICULAR SUSPENSION SYSTEM

[76] Inventor: Kenneth J. MacLeod, 111 Fleurance, Laguna Niguel, Calif. 92677

[21] Appl. No.: 867,716

[22] Filed: Jun. 2, 1997

Related U.S. Application Data

[63] Continuation of Ser. No. 596,718, Feb. 5, 1996, abandoned.

[51] Int. Cl.⁶ .................................................. B60G 11/26
[52] U.S. Cl. ........................... 280/714; 280/772; 280/689
[58] Field of Search ................................ 280/112, 689, 280/707, 714, 772, 702

[56] References Cited

U.S. PATENT DOCUMENTS

| | | | |
|---|---|---|---|
| 4,277,076 | 7/1981 | Hanna | 280/112 |
| 4,606,551 | 8/1986 | Toti | 280/772 |
| 4,752,062 | 6/1988 | Domenichini | 267/186 |
| 5,015,009 | 5/1991 | Ohyama et al. | 280/772 |
| 5,087,072 | 2/1992 | Kawarasaki | 280/772 |
| 5,107,969 | 4/1992 | Klein et al. | 280/714 |
| 5,149,131 | 9/1992 | Sugasawa et al. | 280/772 |
| 5,174,603 | 12/1992 | Lund | 280/772 |
| 5,217,246 | 6/1993 | Williams | 280/707 |
| 5,219,181 | 6/1993 | Lund | 280/772 |
| 5,253,174 | 10/1993 | Inagaki | 364/424 |
| 5,257,814 | 11/1993 | Kohara | 280/707 |
| 5,362,094 | 11/1994 | Jensen | 280/689 |
| 5,447,332 | 9/1995 | Heyring | 280/714 |

FOREIGN PATENT DOCUMENTS

| | | |
|---|---|---|
| 2550235 | 6/1976 | Germany. |
| 9301948 | 2/1993 | WIPO. |

*Primary Examiner*—Kenneth R. Rice
*Attorney, Agent, or Firm*—Stetina Brunda Garred & Brucker

[57] ABSTRACT

A vehicular suspension system having at least one pair of shock absorbers. Each of the shock absorbers of the pair includes a housing defining top and bottom ends and a fluid filled interior chamber, upper and lower ports in communication with the interior chamber, and a piston disposed in the interior chamber which is reciprocally movable through upward and downward strokes therewithin. The lower port of a first shock absorber of the pair is fluidly connected to the upper port of a second shock absorber of the pair via a first fluid line. Similarly, the lower port of the second shock absorber is fluidly connected to the upper port of the first shock absorber via a second fluid line.

14 Claims, 4 Drawing Sheets

VEHICULAR SUSPENSION SYSTEM

This application is a continuation of Ser. No. 08/596,718 filed Feb. 5, 1996, now abandoned.

FIELD OF THE INVENTION

The present invention relates generally to vehicular suspension systems, and more particularly to a method of fluidly interconnecting modified tubular hydraulic shock absorbers comprising the suspension system in a manner facilitating various modes of suspension performance, including an independent suspension mode, a roll control mode, a pitch control mode, and a roll and pitch control mode.

BACKGROUND OF THE INVENTION

In recent years, the automotive industry has been engaged in an ongoing effort to develop a vehicular suspension system which combines the desirable attributes of a smooth ride during cruise with reduced roll and pitch during high acceleration, braking, cornering, and steep inclines. The most popular vehicular suspension system in use today, wherein auto makers have attempted to meet the aforementioned objectives, comprises an independent spring and shock absorber mechanically coupled to each wheel, along with a pair of "anti-roll bars", each of which extends between a transverse pair of wheels. As is well-known in the automotive industry, an anti-roll bar is a transverse torsion bar which provides additional stiffness to the suspension system when roll causes two connected wheels to move in opposite vertical directions. However, the anti-roll bar provides no resistance when the two connected wheels operate together; such as when riding over a speed bump. As will be recognized, this lack of resistance allows separate tuning of the stiffness of the suspension system in roll and bounce.

Though the previously described vehicular suspension system has certain desirable performance attributes, it also possesses deficiencies which detract from its overall utility. In this respect, the anti-roll bars included in the suspension system are of substantial weight (or mass), and therefore noticeably add to the overall weight of the vehicle, thus resulting in reduced mileage performance and increased fuel consumption. Additionally, the anti-roll bars are restricted in their location so as to avoid interfering with other components. Further, since the roll stiffness of this particular type of vehicular suspension system is constant, the automotive designer/engineer must generally compromise ride versus roll control. Indeed, if the anti-roll bar is made very stiff, then bumps to one wheel will tend to cause excessive roll motion to occur. Conversely, if the anti-roll bar is made very flexible cornering or steep cross-wise inclines will tend to induce excessive roll.

In addition to the aforementioned vehicular suspension system, there has also been developed in the prior art a suspension system including a clutch-controlled anti-roll bar. This suspension system comprises a customary anti-roll bar which extends between the front wheels of the vehicle, with an added system of mechanical clutches which are operatively coupled to the anti-roll bar and used to vary the degree of roll stiffness. Though this particular suspension system has been demonstrated to work reasonably well under different road conditions, it also suffers from a number of limitations which detract from its overall utility. In particular, the mechanical clutches included in the system tend to have a relatively short life span, and are prone to mechanical failure which necessitates relatively frequent and expensive repair. Additionally, the anti-roll bars add substantial weight (or mass) therefore increasing fuel consumption and reducing fuel economy. Moreover, the anti-roll bars and clutches are more difficult to fit into the crowded automotive chassis environment. Finally, in this particular suspension system, there is no way to provide anti-pitch control.

There is also known in the prior art various active suspension systems, which use engine power to drive pistons up or down to control the position of each wheel's suspension. Though active suspensions are very sophisticated and can provide variable roll and pitch stiffness, they have proven to be both very expensive and extremely fuel-inefficient. As such, automotive designers/engineers have generally turned away from these complex, active suspension systems for mass-market vehicles.

One further type of prior art vehicular suspension system comprises a variable suspension system (i.e., a variable damping system). In this particular suspension system, the damping system of all four shock absorbers of the vehicle is varied under different driving conditions. For example, the system will generally set the shock absorbers firmer at high speeds and softer at low speeds. Though this adjustability has some effect of increasing roll stiffness at high speeds, it does not facilitate this increase without an equal increase in bounce stiffness.

The present invention is adapted to overcome many of the deficiencies associated with the previously described prior art vehicular suspension systems. In particular, the heavy and cumbersome anti-roll bars are replaced by light weight tubing, which may be flexible to facilitate ease of placement within the existing environment of the automotive chassis. Additionally, the suspension system of the present invention provides for the control of the stiffness of the automotive suspension in roll and/or pitch. In accordance with a first embodiment of the present invention, the stiffness of the suspension system in roll or pitch is controlled without the utilization of sensors or mode control actuators. In this respect, the stiffness can be adjusted by adding or removing hydraulic fluid or pressurized gas from the system, with the principal benefits of the system being reduced weight and more flexible routing of components, as well as adjustability.

In accordance with a second embodiment of the present invention, the control of the stiffness of the suspension system in roll or pitch is automatically varied in two modes of operation. In this respect, when roll or pitch control are not important, such as during cruise at a relatively constant speed on a relatively straight road, complete independence of motion of each wheel is allowed. However, when substantial acceleration in the transverse or longitudinal direction occurs, the suspension adjusts to provide firmer roll or pitch control by synchronizing the vertical motions of transverse or longitudinal pairs of wheels. In particular, synchronization is accomplished by the use of shock absorbers, struts, or dampers.

In accordance with a third embodiment of the present invention, control of the stiffness of the suspension system in roll and/or pitch is automatically varied in four modes of operation. In particular, when roll and pitch control are not important, such as during cruise at a relatively constant speed on a relatively straight road, complete independence of motion of each wheel is allowed. However, when substantial acceleration in either longitudinal and/or transverse directions occurs, the suspension adjusts to provide firmer roll and/or pitch control by synchronizing the vertical motions of pairs of wheels. The four different modes of operation of this particular embodiment of the suspension system include an independent suspension mode, a roll control only mode, a pitch control only mode, and a roll and pitch control mode.

The vehicular suspension system of the present invention includes numerous advantages over those constructed in accordance with the prior art. In this respect, very little hardware is added to the traditional suspension, thus making weight and cost relatively low. Additionally, the heavy and cumbersome anti-roll bars are eliminated. Moreover, no engine power is diverted to the suspension, since it is not an active suspension system. Accordingly, there is no penalty in fuel consumption, unlike active suspension systems. Despite the low weight, cost, and power consumption associated with the suspension system constructed in accordance with the present invention, the same provides the combination of smooth ride in cruise together with reduced roll and pitch during high acceleration, braking, cornering, and steep inclines.

SUMMARY OF THE INVENTION

In accordance with the present invention, there is provided a vehicular suspension system having at least one pair of shock absorbers. Each of the shock absorbers of the pair includes a housing defining top and bottom ends and a fluid filled interior chamber, upper and lower ports in communication with the interior chamber, and a piston disposed in the interior chamber which is reciprocally movable through upward and downward strokes therewithin. In the suspension system, the lower port of a first shock absorber of the pair is fluidly connected to the upper port of a second shock absorber of the pair via a first fluid line. Similarly, the lower port of the second shock absorber is fluidly connected to the upper port of the first shock absorber via a second fluid line.

The first and second fluid lines are each preferably fabricated from flexible hydraulic tubing, and may alternatively be fabricated from rigid pipe. Additionally, the first and second fluid lines may each include a fluid accumulator connected thereto, which comprises a pressurized gas accumulator. Alternatively, the interior chamber of each of the shock absorbers of the pair may include a segregated section which is defined between the top of the housing and the upper port, and is filled with a pressurized gas.

The vehicular suspension system constructed in accordance with the present invention further comprises a valve member which is fluidly connected to the first and second fluid lines, and is selectively actuatable between open and closed positions. When the valve member is in the closed position, fluid flows between the lower port of the first shock absorber and the upper port of the second shock absorber, and between the lower port of the second shock absorber and the upper port of the first shock absorber. Alternatively, when the valve member is in the open position, fluid flows between the upper and lower ports of the first shock absorber and between the upper and lower ports of the second shock absorber (i.e., in an independent suspension mode). The suspension system may further comprise an acceleration sensor or other appropriate sensor which is connected electrically or by other means to the valve member and adapted to facilitate the selective actuation thereof between the open and closed positions.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
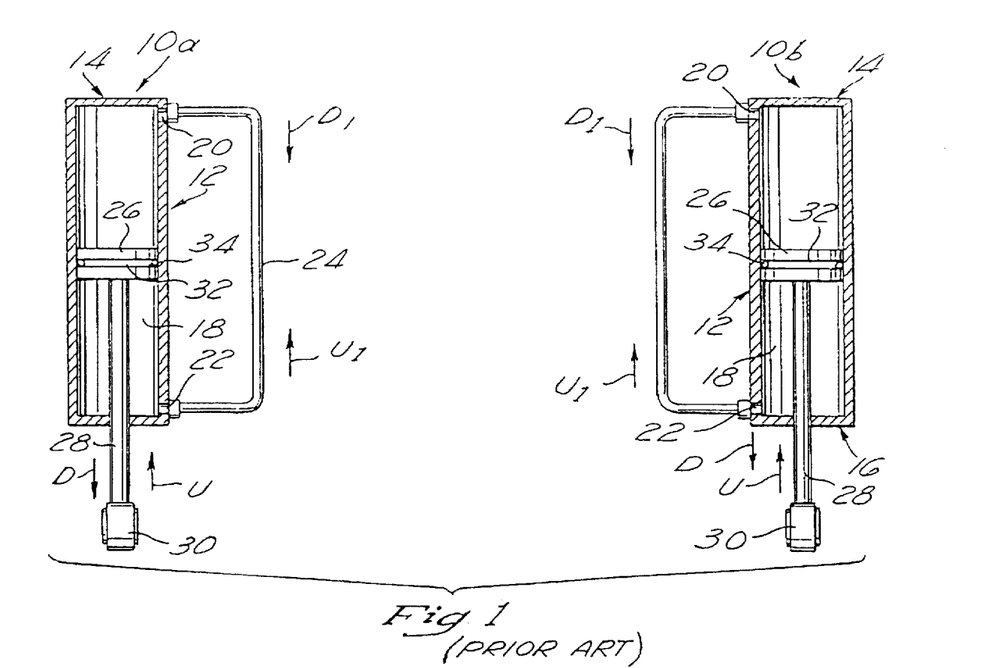
FIG. 1 is a cross-sectional view of a portion of a prior art suspension system including a pair of shock absorbers adapted to operate solely in an independent suspension mode.

Referring now to the drawings wherein the showings are for purposes of illustrating preferred embodiments of the present invention only and not for purposes of limiting the same, FIG. 1 depicts a pair of identically configured shock absorbers 10a, 10b which comprise slightly modified versions of standard monotube shock absorbers and form part of a vehicular suspension system adapted to operate solely in a prior art independent suspension mode. As will be recognized, the shock absorbers 10a, 10b shown in FIG. 1 form part of a suspension system which typically includes right front, left front, right rear and left rear shock absorbers, each of which are mechanically coupled to a respective wheel.

The shock absorbers 10a, 10b each comprise an elongate, generally cylindrical housing 12 defining a top end 14, a bottom end 16 and an interior chamber 18 which is filled with hydraulic fluid. Disposed within the housing 12 adjacent the top end 14 thereof is an upper port 20 which communicates with the interior chamber 18. Similarly, disposed within the housing 12 adjacent the bottom end 16 thereof is a lower port 22 which also communicates with the interior chamber 18. The upper and lower ports 20, 22 are fluidly connected to each other via a fluid line 24. Though not shown, each shock absorber 10a, 10b, and in particular the housing 12 thereof, includes damping orifices and shock valves which function in a conventional manner.

Disposed within the interior chamber 18 of the housing 12 is a piston 26 which is reciprocally movable through upward and downward strokes therewithin. Extending axially from the piston 26 is a piston rod 28 which itself extends through an aperture formed within the bottom end 16 of the housing 12, and includes a mounting bracket 30 disposed on the distal end thereof. Though also not shown, the aperture formed in the bottom end 16 of the housing 12 includes one or more seals associated therewith which co-act with the piston rod 28 in a manner preventing hydraulic fluid from leaking from the interior chamber 18 when the piston rod 28 moves axially in an upward and downward direction within the aperture. The piston 26 preferably includes a continuous channel 32 extending about the periphery thereof which accommodates a sealing ring or O-ring 34. The O-ring 34 resides in sliding, abutting contact with the inner surface of the housing 12 defining the interior chamber 18, and prevents hydraulic fluid from seeping between the peripheral surface of the piston 26 and the inner surface of the housing 12 when the piston 26 moves through its upward and downward strokes.

In the normal operation of each shock absorber 10a, 10b, the upward movement of the piston rod 28 in the direction U facilitates an upward stroke of the piston 26 which in turn forces hydraulic fluid out of the interior chamber 18 via the upper port 20. After being forced through the upper port 20, the hydraulic fluid flows downwardly through the fluid line 24 in the direction D1 and subsequently re-enters the interior chamber 18 via the lower port 22. Conversely, the movement of the piston rod 28 in a downward direction D facilitates a downward stroke of the piston 26 which forces fluid from the interior chamber 18 via the lower port 22. After being forced through the lower port 22, the fluid flows upwardly in the fluid line 24 in the direction U1 and subsequently re-enters the interior chamber 18 via the upper port 20. As will be recognized, due to their manner of operation, each of the shock absorbers 10a, 10b constitutes a closed loop system, and thus is adapted to provide dampening only to a respective wheel of the vehicle to which it is mechanically coupled.

Figure 2:
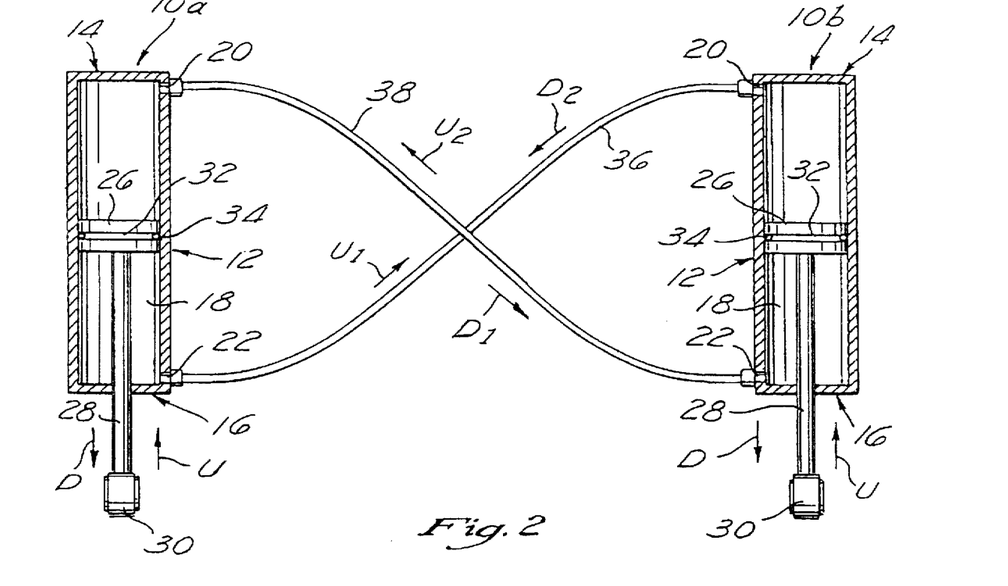
FIG. 2 is a cross-sectional view of a portion of a suspension system of the present invention including a pair of shock absorbers fluidly connected to each other in a manner facilitating roll and/or pitch control.

Referring now to FIG. 2, there is depicted a first embodiment of the present invention wherein the shock absorbers 10a, 10b shown in FIG. 1, rather than including the fluid lines 24, are hydraulically cross-connected. In particular, the lower port 22 of the shock absorber 10a is fluidly connected to the upper port 20 of the shock absorber 10b via a first fluid line 36, with the lower port 22 of the shock absorber 10b being fluidly connected to the upper port 20 of the shock absorber 10a via a second fluid line 38. In the preferred embodiment, the first and second fluid lines 36, 38 are each fabricated from flexible hydraulic tubing.

When the shock absorbers 10a, 10b are interconnected via the first and second fluid lines 36, 38, the movement of the piston rod 28 of the shock absorber 10a in an upward direction U facilitates an upward stroke of the piston 26 thereof. This upward stroke of the piston 26 causes hydraulic fluid to be forced out of the interior chamber 18 of the shock absorber 10a via its upper port 20, and downwardly through the second fluid line 38 in the direction D1 into the interior chamber 18 of the shock absorber 10b via its lower port 22. Conversely, the movement of the piston rod 28 of the shock absorber 10a in a downward direction D facilitates a downward stroke of the piston 26 thereof, which in turn forces hydraulic fluid out of the interior chamber 18 of the shock absorber 10a via its lower port 22. Subsequent to being forced out of the lower port 22 of the shock absorber 10a, the hydraulic fluid flows upwardly through the first fluid line 36 in the direction U1 and enters the interior chamber 18 of the shock absorber 10b via its upper port 20.

As will be recognized, the shock absorber 10b behaves in an identical manner. In this respect, the downward movement of the piston rod 28 in the direction D causes hydraulic fluid to be forced out of the interior chamber 18 of the shock absorber 10b through its lower port 22, with the hydraulic fluid flowing upwardly through the second fluid line 38 in the direction U2 and entering the interior chamber 18 of the shock absorber 10a via its upper port 20. The upward movement of the piston rod 28 of the shock absorber 10b in the direction U causes hydraulic fluid to be forced out of the upper port 20, with the hydraulic fluid then flowing downwardly through the first fluid line 36 in the direction D2 and entering the interior chamber 18 of the shock absorber 10a via its lower port 22.

By cross-connecting the shock absorbers 10a, 10b in the manner shown in FIG. 2, the vertical motions thereof are synchronized. In this respect, the hydraulic fluid forced out of one end of a shock absorber 10a, 10b of the pair will be routed into the opposite end of the other shock absorber 10a, 10b of the pair, thus forcing its piston 26 to move in the same direction and distance. As will be recognized, the pistons 26 incorporated into the shock absorbers 10a, 10b need to be solid in order to act as a hydraulic ram. Although being hydraulically cross-connected, the shock absorbers 10a, 10b are otherwise of normal size, construction and placement, thus minimizing the changes necessary in the design of the vehicle, and allowing the easy addition of the interconnected shock absorbers 10a, 10b to existing designs. Advantageously, the synchronized motion of the shock absorbers 10a, 10b facilitated by hydraulically cross-connecting the same allows both to move up and down freely, but only together. This synchronization results in greatly increased roll or pitch stiffness.

Figure 3:
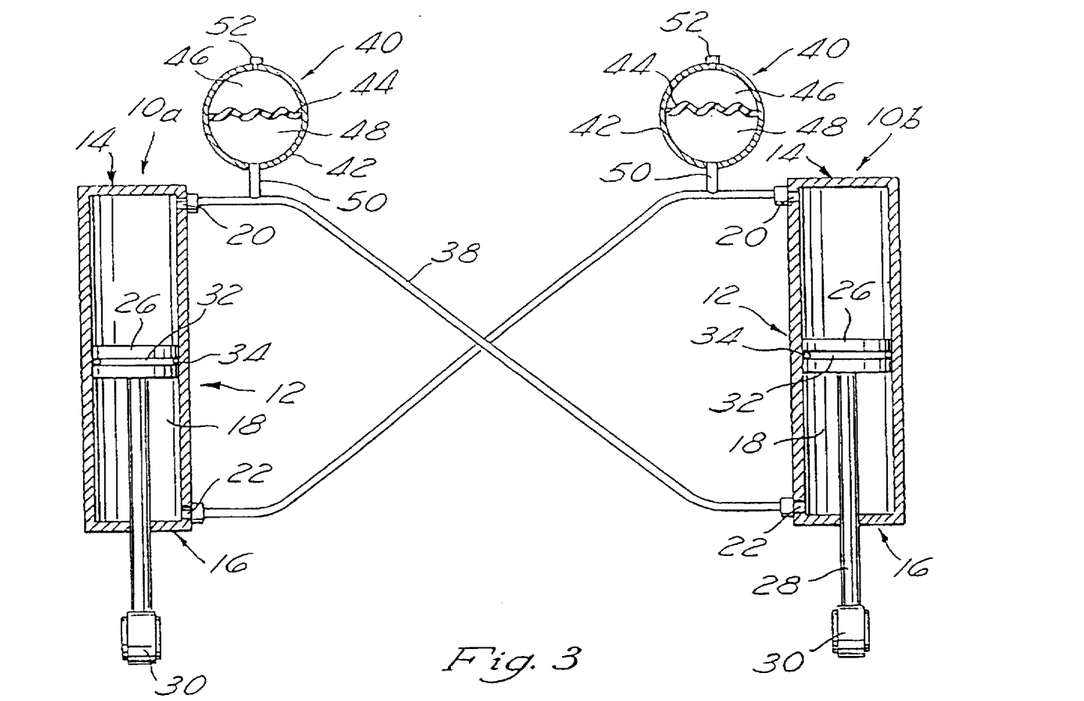
FIG. 3 is a cross-sectional view of the suspension system shown in FIG. 2, further illustrating fluid accumulators connected to respective ones of the fluid lines used to fluidly connect the shock absorbers to each other.

Referring now to FIG. 3, there is depicted a portion of a suspension system constructed in accordance with a second embodiment of the present invention which is substantially similar to that shown in FIG. 2, but further includes of a pair of identically configured fluid accumulators 40 which are fluidly connected to respective ones of the first and second fluid lines 36, 38 hydraulically cross-connecting the shock absorbers 10a, 10b. The fluid accumulators 40 each comprise a hollow, spherically configured housing 42 which defines an interior reservoir. Disposed within the reservoir of each housing 42 is a resilient diaphragm 44 which bisects the reservoir into an upper half 46 and a lower half 48. The lower half 48 of each reservoir is fluidly connected to a respective one of the first and second fluid lines 36, 38 via a tubular coupling 50. As such, the lower halves 48 of the reservoirs of the fluid accumulators 40 are typically filled with hydraulic fluid due to their direct communication with respective ones of the first and second fluid lines 36, 38. The upper halves 46 of the reservoirs of the fluid accumulators 40 are each preferably filled with a pressurized gas via a valve 52 disposed within the housing 42 of each fluid accumulator 40.

Though the suspension system shown in FIG. 2 provides greatly increased roll or pitch stiffness due to the synchronized movement of the shock absorbers 10a, 10b, the stiffness may at times exceed the level which facilitates optimal ride comfort. To provide some level of compliance, much like the customary anti-roll bars, the pressurized gas fluid accumulators 40 are connected to respective ones of the first and second fluid lines 36, 38 in the aforementioned manner. Advantageously, the fluid accumulators 40 allow the pressurized gas charged into the upper halves 46 of the reservoirs thereof to act as a spring, thus allowing some degree of roll motion to occur in the suspension system. Importantly, the roll stiffness can be selectively adjusted by either adding or removing gas from within the upper halves 46 via the valves 52 disposed within the housings 42. As will be recognized, adding pressurized gas to the upper halves 46 of the reservoirs via the valves 52 increases the pressure exerted against the diaphragms 44 which in turn increases the hydraulic fluid pressure within the first and second fluid lines 36, 38 and interior chambers 18, thus increasing the stiffness of the suspension system. Conversely, bleeding gas from within the upper halves 46 via the valves 52 decreases the pressure exerted against the diaphragms 44 which in turn decrease the hydraulic fluid pressure within the first and second fluid lines 36, 38 and interior chambers 18, thus decreasing the stiffness of the suspension system. The accumulators 40 also allow for the displacement of fluid by the piston rods 28 as they move in and out of the interior chambers 18.

Figure 4:
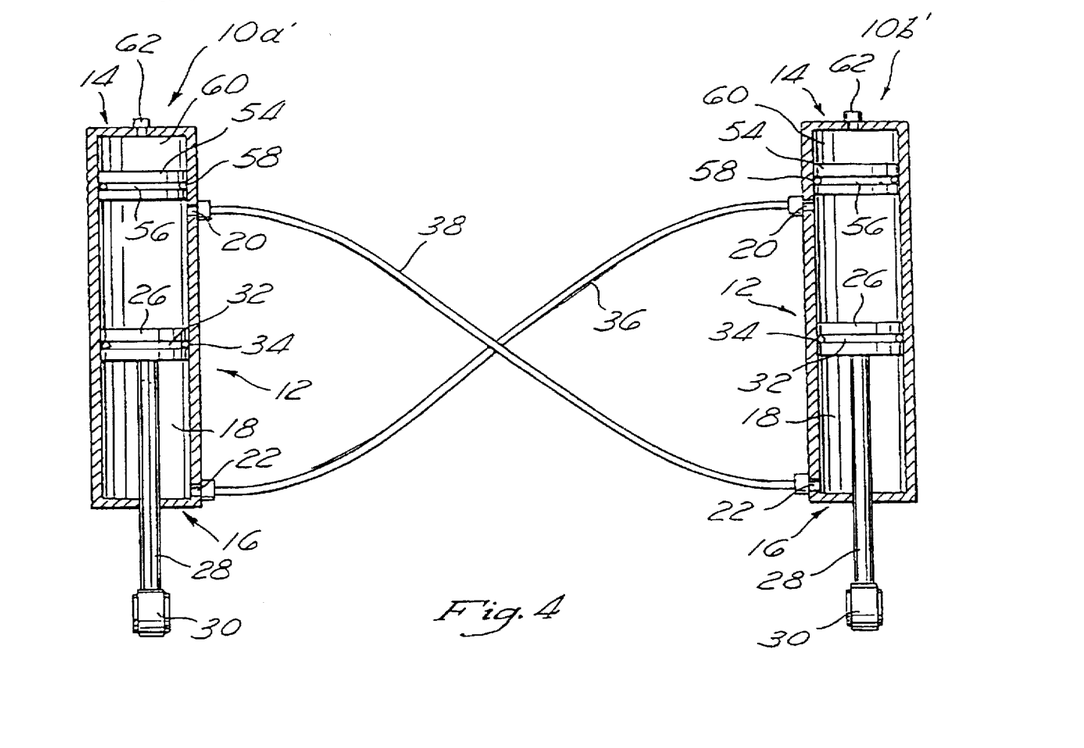
FIG. 4 is a cross-sectional view illustrating an alternative embodiment of the suspension system shown in FIG. 3 wherein the fluid accumulators are incorporated into the shock absorbers.

Referring now to FIG. 4, there is depicted a portion of a suspension system constructed in accordance with a third embodiment of the present invention which functions in a manner similar to that shown in FIG. 3, but includes fluid accumulators (which operate in a manner similar to the previously described fluid accumulators 40) integrated directly into the shock absorbers 10a', 10b' thereof. The shock absorbers 10a', 10b' are substantially similar to the previously described shock absorbers 10a, 10b, respectively. However, the housing 12 of each of the shock absorbers 10a', 10b' has a length exceeding that of the shock absorbers 10a, 10b, with the top end 14 thereof being spaced from the upper port 20 rather than being disposed adjacent thereto as in the shock absorbers 10a, 10b. Additionally, disposed within the interior chamber 18 of each of the shock absorbers 10a', 10b' is a floating piston 54 which normally resides between the upper port 20 and the top end 14. Like the piston 26, the floating piston 54 preferably includes a continuous channel 56 extending about the periphery thereof which accommodates a sealing ring or O-ring 58. In the shock absorbers 10a', 10b', a segregated section 60 is defined between the top end 14 of the housing 12 and the floating piston 54. Each segregated section 60 is preferably filled with a pressurized gas via a valve 62 which is disposed within the top end 14.

In each of the shock absorbers 10a', 10b', only the segregated section 60 of the interior chamber 18 is filled with pressurized gas, with the remainder thereof being filled with hydraulic fluid. The O-ring 58 of the floating piston 54 resides in sliding, abutting contact with the inner surface of the housing 12 defining the interior chamber 18 (as well as the segregated section 60), and prevents hydraulic fluid from seeping between the peripheral surface of the floating piston 54 and the inner surface of the housing 12 into the segregated section 60 when the floating piston 54 shifts. As previously indicated, the gas-filled segregated section 60 of each of the shock absorbers 10a', 10b' acts in the same manner as a fluid accumulator 40 as shown in FIG. 3. In this respect, an increase in the gas pressure within the segregated section 60 exerts increased pressure against the floating piston 54, which in turn increases the hydraulic fluid pressure within the first and second fluid lines 36, 38 and interior chambers 18, thus increasing the stiffness of the suspension system. Conversely, a decrease in the gas pressure within the segregated section 60 decreases the pressure exerted against the floating piston 54, which in turn decreases the hydraulic fluid pressure within the first and second fluid lines 36, 38 and interior chambers 18, thus decreasing the stiffness of the suspension system. It will be recognized that the shock absorbers 10a', 10b' may each be alternatively configured such that the segregated section 60 is defined between the bottom end 16 and the lower port 22.

It will be recognized that the volume of hydraulic fluid normally present within the interior chamber 18 of each shock absorber 10a', 10b' is sufficient to prevent the floating piston 54 from moving axially over the upper port 20 in a manner blocking the same, even when the segregated section 60 is pressurized to its maximum. A stop may also be formed within the interior chamber 18 to prevent such blockage from ever occurring. Additionally, though as shown in FIG. 4 each of the shock absorbers 10a', 10b' incorporates a floating piston 54, it will be recognized that alternative structures nay be used to define the segregated section 60, such as a bladder or bellows. In the prior art, pressurized gas chambers similar to the segregated section 60 previously described are incorporated into some shock absorbers in order to allow for fluid displacement caused by the piston rods and reduce cavitation of the hydraulic fluid during rough driving. Since in the suspension system shown in FIG. 4, a fluid accumulator is integrated directly into each shock absorber 10a', 10b', the first and second fluid lines 36, 38 used to hydraulically cross-connect the same are preferably fabricated from flexible hydraulic tubing.

Figure 5:
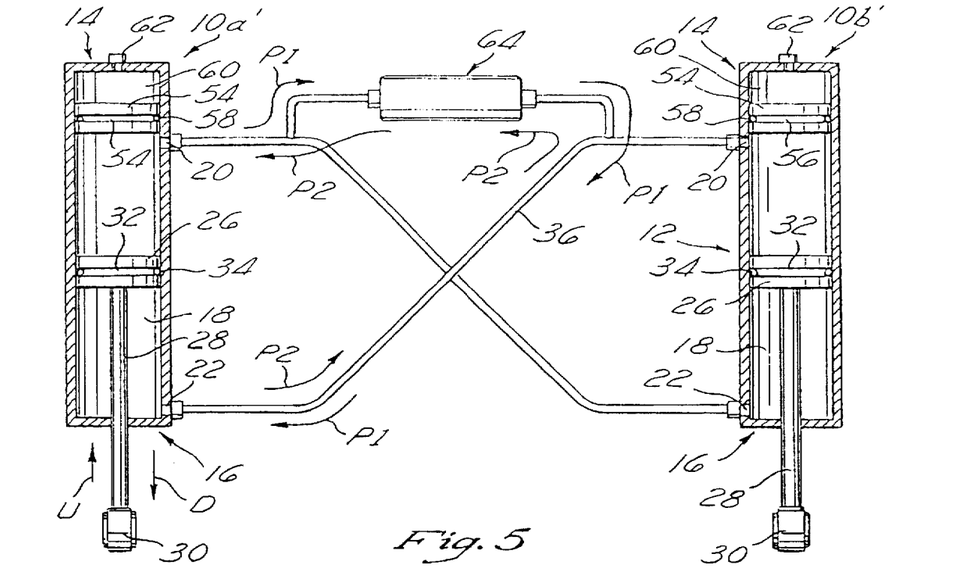
FIG. 5 is a cross-sectional view illustrating an alternative embodiment of the suspension system shown in FIG. 4 wherein a valve member is fluidly connected to the fluid lines to facilitate the operation of the suspension system in multiple modes.

Referring now to FIG. 5, there is depicted a portion of a suspension system which is constructed in accordance with a fourth embodiment of the present invention. The suspension system shown in FIG. 5 is similar to that shown in FIG. 4, but further includes a valve member 64 fluidly connected to the first and second fluid lines 36, 38 hydraulically cross-connecting the shock absorbers 10a', 10b'. Advantageously, due to the inclusion of the valve member 64, the shock absorbers 10a', 10b' of the suspension system shown in FIG. 5 are adapted to function either independently (as shown in FIG. 1) or in a synchronized fashion (as shown in FIGS. 2–4).

The valve member 64 comprises a hydraulic valve which is selectively actuatable between open and closed positions. In accordance with the present invention, the actuation of the valve member 64 between the open and closed positions may be facilitated directly by forces of acceleration acting on a mass attached to the valve member 64, or indirectly by an electrical solenoid or hydraulic or pneumatic piston actuated by separate acceleration sensors. When the valve member 64 is in the closed position, hydraulic fluid flows through the first and second fluid lines 36, 38 in the same manner as previously described in relation to the suspension systems shown in FIGS. 2–4. In this respect, the shock absorbers 10a', 10b' are caused to move in a synchronized manner due to the same being hydraulically cross-connected.

However, when the valve member 64 is actuated to the open position, the shock absorbers 10a', 10b' are caused to function in an independent suspension mode. In this respect, the movement of the piston rod 28 of the shock absorber 10a' in an upward direction U facilitates an upward stroke of the piston 26 which causes hydraulic fluid to be forced out of the interior chamber 18 of the shock absorber 10a' via its upper port 20. The hydraulic fluid exiting the upper port 20 flows through a small portion of the second fluid line 38, through the open valve member 64, downwardly through a substantial portion of the first fluid line 36, and back into the interior chamber 18 of the shock absorber 10a' via its lower port 22. This particular flow path of the hydraulic fluid is designated by the arrows P1 shown in FIG. 5.

Conversely, the movement of the piston rod 28 of the shock absorber 10a' in a downward direction D facilitates a downward stroke of the piston 26 which forces hydraulic fluid out of the interior chamber 18 of the shock absorber 10a' via its lower port 22. Subsequent to being forced out of the lower port 22, the hydraulic fluid flows upwardly through a substantial portion of the first fluid line 36, through the open valve member 64, through a small portion of the second fluid line 38, and back into the interior chamber 18 of the shock absorber 10a' via its upper port 20. This particular flow path of the hydraulic fluid is designated by the arrows P2 shown in FIG. 5. As such, the actuation of the valve member 64 to the open position causes the hydraulic fluid to be circulated within the interior chamber 18 of the shock absorber 10a' when the piston 26 is caused to move upwardly or downwardly therewithin. It will be recognized that the shock absorber 10b' behaves in a like manner when the valve member 64 is actuated to the open position.

As previously indicated, a vehicular suspension system typically includes right front, left front, right rear and left rear shock absorbers, each of which are mechanically coupled to a respective wheel. In FIGS. 6a–6d, the right front shock absorber is designated as 100a, the left front shock absorber as 100b, the right rear shock absorber as 100c, and the left rear shock absorber as 100d. The shock absorbers 100a–100d are each preferably configured identically to the shock absorbers 10a', 10b' shown in FIGS. 4 and 5, though it will be recognized that the same need not include the segregated sections 60, and may be configured identically to the shock absorbers 10a, 10b shown in FIG. 3.

Figure 6A:
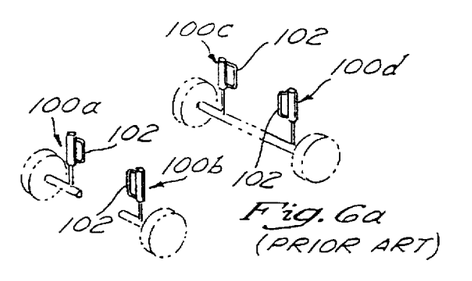
FIG. 6a is a partial perspective view illustrating a prior art suspension system adapted to operate solely in an independent suspension mode.

FIG. 6a depicts a suspension system wherein the shock absorbers 100a–100d thereof are adapted to function solely in an independent suspension mode in accordance with the prior art. In this respect, the upper and lower ports of each of the shock absorbers 100a–100d are interconnected via a fluid line 102 which, as previously explained, permits each of the shock absorbers 100a–100d to operate solely as a closed-loop system (i.e., in an independent suspension mode).

Figure 6B:
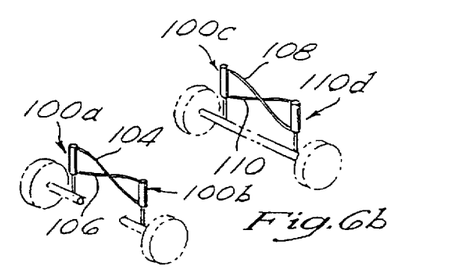
FIG. 6b is a partial perspective view illustrating a suspension system of the present invention which is adapted to operate in a roll control mode.

Referring now to FIG. 6b, in accordance with the present invention, increased roll control is facilitated in the suspension system by hydraulically cross-connecting the right front and left front shock absorbers 100a, 100b to each other via fluid lines 104, 106, and hydraulically cross-connecting the right rear and left rear shock absorbers 100c, 100d to each other via fluid lines 108, 110. Such hydraulic cross-connection is facilitated in the manner previously shown and described in relation to FIGS. 2–5. Though not shown, it is contemplated that a first valve member 64 may be fluidly connected to the fluid lines 104, 106, and that a second valve member 64 may be fluidly connected to the fluid lines 108, 110. The inclusion of such valve members 64 within the suspension system shown in FIG. 6b would allow the same to operate in either the roll control mode or an independent suspension mode (as shown in FIG. 6a) due to the change in the hydraulic fluid flow paths which would be caused by the simultaneous actuation of the valve members 64 to the open position, as previously explained in relation to FIG. 5.

Though in the suspension system shown in FIG. 6b (including the first and second valve members 64) control could in principle be provided on only one axle, the transition between the independent suspension and roll control modes would cause undesirable changes in oversteer/understeer characteristics of the vehicle during cornering. As such, in the preferred embodiment of the present invention, roll control will always be provided on both axles, i.e., the shock absorbers 100a, 100b will be hydraulically cross-connected, as will the shock absorbers 100c, 100d.

Figure 6C:
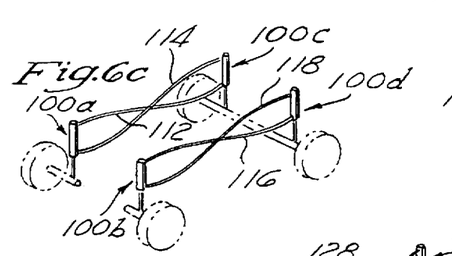
FIG. 6c is a partial perspective view of a suspension system of the present invention which is adapted to operate in a pitch control mode.

Referring now to FIG. 6c, there is depicted a suspension system adapted to facilitate increased pitch control. Such increased pitch control is accomplished by hydraulically cross-connecting the right front and right rear shock absorbers 100a, 100c to each other via fluid lines 112, 114, and hydraulically cross-connecting the left front and left rear shock absorbers 100b, 100d to each other via fluid lines 116, 118. Additionally, though not shown, a first valve member 64 may be fluidly connected to the fluid lines 112, 114 and a second valve member 64 fluidly connected to the fluid lines 116, 118 to facilitate the selective operation of the suspension system shown in FIG. 6c in either the pitch control mode or an independent suspension mode (as shown in FIG. 6a).

Figure 6D:
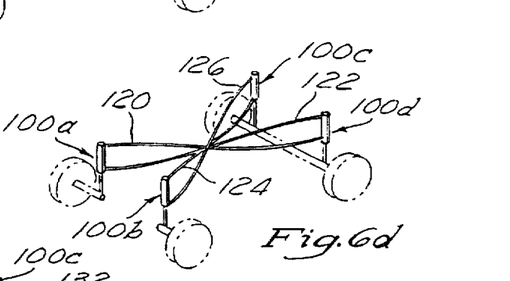
FIG. 6d is a partial perspective view of a suspension system of the present invention which is adapted to operate in a roll and pitch control mode.

Referring now to FIG. 6d, there is depicted a suspension system which is adapted to facilitate increased roll and pitch control. Such increased roll and pitch control is accomplished by hydraulically cross-connecting the right front and left rear shock absorbers 100a, 100d to each other via fluid lines 120, 122, and hydraulically cross-connecting the left front and right rear shock absorbers 100b, 100c to each other via fluid lines 124, 126. Once again, though not shown, a first valve member 64 may be fluidly connected to the fluid lines 120, 122, and a second valve member 64 fluidly connected to the fluid lines 124, 126 to facilitate the selective operation of the suspension system shown in FIG. 6d in either the roll and pitch control mode, or in an independent suspension mode (as shown in FIG. 6a).

The hydraulic cross-connection of the shock absorbers as shown in FIGS. 6b, 6c, 6d has the effect of synchronizing the direction and distance of motion of each pair of cross-connected shock absorbers. The effect is the same as fitting a stiff roll bar, for example, between the two front wheels of the vehicle. The springs and shock absorbers still operate with their normal functions, though the roll and/or pitch stiffness of the vehicle is greatly increased.

When the first and second valve members 64 are included in the suspension systems shown in FIGS. 6b, 6c, 6d, they are preferably connected to their respective fluid lines in close proximity to the crossover points thereof, and are disposed under the vehicle near its center. However, it will be recognized that the valve members 64 may also be disposed in alternate locations within the vehicle frame.

Figure 7:
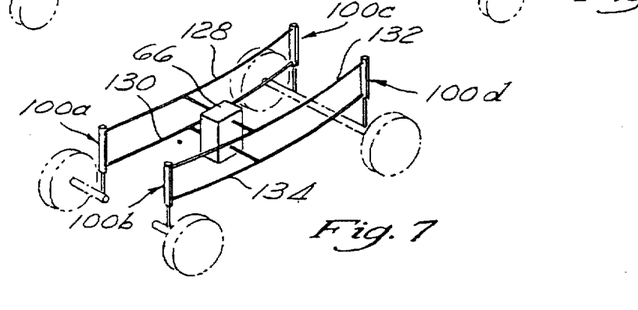
FIG. 7 is a partial perspective view of a suspension system of the present invention which is adapted to operate in a roll control mode.

Referring now to FIG. 7, there is depicted a suspension system which, like the suspension system shown in FIG. 6b, is adapted to facilitate roll control. However, in the suspension system shown in FIG. 7, the right front and right rear shock absorbers 100a, 100c are hydraulically connected in parallel, as are the left front and left rear shock absorbers 100b, 100d. In particular, the upper ports of the right front and right rear shock absorbers are fluidly connected to each other via a fluid line 128, with the lower ports thereof being fluidly connected to each other via a fluid line 130. Similarly, the upper ports of the left front and left rear shock absorbers 100b, 100d are fluidly connected to each other via a fluid line 132. with the lower ports thereof being fluidly connected to each other via a fluid line 134. The fluid lines 128, 130, 132, 134 are themselves each fluidly connected to a valve member 66 which is selectively actuatable between open and closed positions. The valve member 66, when in the closed position, fluidly connects the fluid line 128 to the fluid line 134, and the fluid line 130 to the fluid line 132, thereby hydraulically cross-connecting the right front and right rear shock absorbers 100a, 100c to the left front and left rear shock absorbers 100b, 100d. When actuated to the open position, the valve member 66 causes the suspension system to operate in an independent suspension mode by causing the hydraulic fluid to be circulated between the upper and lower ports of each of the shock absorbers 100a–100d of the suspension system.

Advantageously, the valve member 66, when in the open position, controls the mode of both the front and rear shock absorbers of the suspension system, which results in the average motion of the left front and left rear shock absorbers 100b, 100d being the same as the average motion of the right front and right rear shock absorbers 100a, 100c. This particular suspension system also allows some independence for bumps to cause the left and right pairs of shock absorbers to move differently.

Figures 8A, 8D:
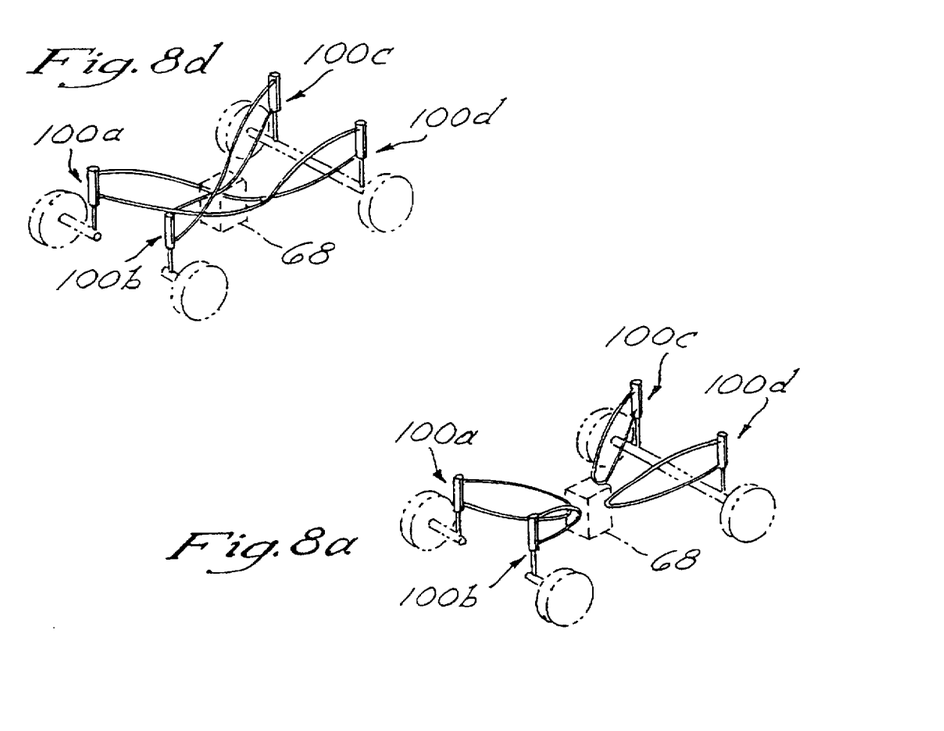
FIG. 8a is a partial perspective view illustrating the independent suspension mode of a suspension system of the present invention which is adapted to operate in multiple modes.
FIG. 8d is a partial perspective view illustrating the roll and pitch control mode of a suspension system of the present invention which is adapted to operate in multiple modes.
Figure 8B:
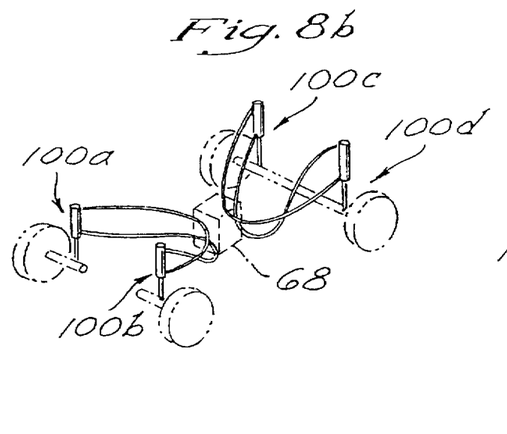
FIG. 8b is a partial perspective view illustrating the roll control mode of a suspension system of the present invention which is adapted to operate in multiple modes.
Figure 8C:
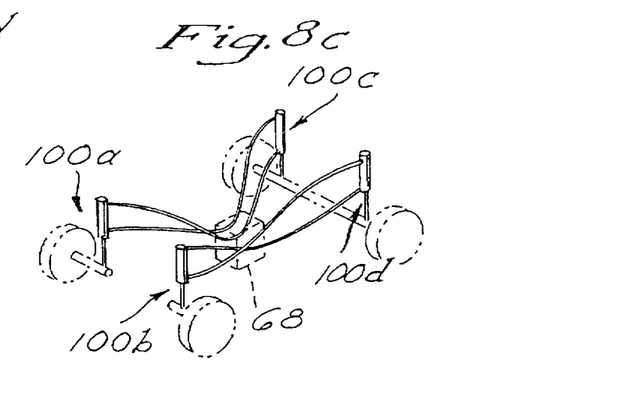
FIG. 8c is a partial perspective view illustrating the pitch control mode of a suspension system of the present invention which is adapted to operate in multiple modes.

Referring now to FIGS. 8a–8d, further in accordance with the present invention, it is contemplated that the upper and lower ports of each of the shock absorbers 100a–100d comprising the suspension system may be fluidly connected to a centrally positioned valve manifold 68 which is adapted to allow the suspension system to operate in either of four (4) separate modes, i.e., an independent suspension mode (shown in FIG. 8a), a roll control mode (shown in FIG. 8b), a pitch control mode (shown in FIG. 8c), or a roll and pitch control mode (shown in FIG. 8d). The upper and lower ports of each shock absorber 100a–100d of the suspension system are fluidly connected to the valve manifold 68 via separate fluid lines. The valve manifold 68 is internally configured so as to be actuatable in a manner facilitating the flow of hydraulic fluid between the various shock absorbers 100a–100d in a variety of different flow paths as are needed to facilitate operation of the suspension system in the aforementioned modes as shown in FIGS. 8a–8d. In particular, the valve manifold 68 is actuatable between first, second, third and fourth positions. The suspension system operates in the independent suspension mode (shown in FIG. 8a) when the valve manifold 68 is actuated to the first position, and operates in the roll control mode (shown in FIG. 8b) when the valve manifold 68 is actuated to the second position. Additionally, the suspension system operates in the pitch control mode (shown in FIG. 8c) when the valve manifold 68 is actuated to the third position, and operates in the roll and pitch control mode (shown in FIG. 8d) when the valve manifold 68 is actuated to the fourth position.

As previously explained, the valve members 64 may be actuated between their open and closed positions by acceleration sensors, which are preferred, though other types of sensors may also be utilized. Such acceleration sensors are also preferably used to facilitate the actuation of the valve member 66 between its open and closed positions, and the actuation of the valve manifold 68 between its four different positions. It is contemplated that longitudinal and transverse acceleration sensors will be mounted to the chassis or body of the vehicle at locations close to the related axis of rotation. More particularly, the transverse acceleration sensor would be mounted near the vehicle's roll axis. This placement would minimize spurious accelerations caused by roll induced in the vehicle by bumps on one side or by other causes. The acceleration sensors may be mechanical or electrical, and may be damped or undamped. Typically, some damping in the system will be needed to avoid extremely rapid switching between modes. Such damping could be supplied in the acceleration sensors, or the valve members 64, 66 or valve manifold 68 themselves. Additionally, the acceleration sensors may be connected to the valve members and valve manifold electrically, mechanically, pneumatically, or via some other suitable means.

It is further contemplated that any suspension system constructed in accordance with the present invention may incorporate a controller which facilitates the operation of the suspension system in one of its modes. The controller could be direct mechanical, direct electronic, or indirect through a computing controller. By way of example, a direct mode controller could includes a sensing mass attached to the movable part of the valve member 64, 66 or the movable parts of the valve manifold 68 to control roll on both axles. In this respect, simple springs and dash pots could be employed to control the threshold at which the system switches between its various modes of operation. Alternatively, electrical acceleration sensors could be used to directly control the valve member 64, 66 or valve manifold 68 through electrical solenoids. These sensors would open or close an electrical circuit when the appropriate threshold of acceleration was exceeded. In the case of the computing controller, the sensors could provide a signal proportional to the appropriate acceleration, and the controller could process the signal and compute the thresholds.

As previously explained, the suspension system constructed in accordance with the present invention may be provided with an adjustable gas or hydraulic fluid pressure spring which could make the roll and/or pitch control softer by allowing the shock absorbers to have some differential motion. Provision could be made for the user to adjust the stiffness of this spring, either by adding gas or hydraulic fluid from an external source such as an air hose at a service station, or from an on-board pump or compressor.

Additionally, it is conceivable that hydraulic fluid could leak around the O-rings 34 of the pistons 26 of one or more of the shock absorbers of the suspension system, thus causing a potential imbalance between the volumes of fluid in a hydraulically cross-connected pair of shock absorbers. Though this is unlikely, such imbalance could result in the vehicle taking a "set" in the roll and/or pitch axis. In the embodiments shown in FIG. 6a–6d (including the first and second valve members 64), FIG. 7 and FIGS. 8a–8d, such fluid imbalance would not be a problem since the valve members 64, 66 and valve manifold 68 would allow the "set" to recover as soon as the acceleration declined and the valve members/manifold were actuated to open positions. However, in the basic modes of operation (shown in FIGS. 6b, 6c, and 6d with no valve members 64 being included) the "set" could persist. However, this set could be resolved by allowing fluid to bleed between the two volumes, or by providing a valve which connects the two volumes when the ignition is off.

It is contemplated that the suspension system of the present invention may also be provided with bump preset recovery capability. Typically, if a bump presets the suspension of an outside wheel to the full upward position just before a sensor switches to the roll and/or pitch control mode, the outside wheel would effectively be kept from recovering, and the vehicle will be caused to roll more than it would have without the suspension system being in place. However, this occurrence can be avoided by placing a one-way valve in the cross-connected fluid lines. Alternatively, the suspension system could include sensors for individual suspension positions, and could delay entering the roll and/or pitch control mode until the wheel has recovered sufficiently.

Additional modifications and improvements of the present invention may also be apparent to those skilled in the art. Thus, the particular combination of parts described and illustrated herein is intended to represent only certain embodiments of the present invention, and is not intended to serve as limitations of alternative devices within the spirit and scope of the invention.

What is claimed is:

1. In a vehicular suspension system having at least one pair of shock absorbers, wherein each of the shock absorbers of the pair includes a housing defining top and bottom ends and a fluid filled interior chamber, upper and lower ports in communication with the interior chamber, and a piston disposed in the interior chamber which is reciprocally movable through upward and downward strokes therewithin, the improvement comprising:

fluidly connecting the lower port of a first shock absorber of the pair to the upper port of a second shock absorber of the pair via a first fluid line; and fluidly connecting the lower port of the second shock absorber to the upper port of the first shock absorber via a second fluid line;

a valve member which is fluidly connected to the first and second fluid lines, and is selectively actuatable between open and closed positions such that:

fluid flows between the lower port of the first shock absorber and the upper port of the second shock absorber, and between the lower port of the second shock absorber and the upper port of the first shock absorber when the valve member is in the closed position;

fluid flows between the upper and lower ports of the first shock absorber, and between the upper and lower ports of the second shock absorber when the valve member is in the open position; and an acceleration sensor electrically connected to said valve member and adapted to facilitate the selective actuation thereof between the open and closed positions.

2. The vehicular suspension system of claim 1 wherein the first and second fluid lines are each fabricated from flexible hydraulic tubing.

3. The vehicular suspension system of claim 1 wherein said first and second fluid lines are each fabricated from rigid pipe.

4. The vehicular suspension system of claim 1 wherein the first and second fluid lines each include a fluid accumulator connected thereto.

5. The vehicular suspension system of claim 4 wherein the fluid accumulator comprises a pressurized gas accumulator.

6. The vehicular suspension system of claim 1 wherein the interior chamber of each of the shock absorbers of the pair includes a segregated section which is filled with a pressurized gas.

7. The vehicular suspension system of claim 6 wherein the segregated section is defined between the top end of the housing and the upper port.

8. A vehicular suspension system having two pairs of shock absorbers including right front, left front, right rear and left rear shock absorbers, wherein each of the shock absorbers of the pair includes a housing defining top and bottom ends and a fluid filled interior chamber, upper and lower ports in communication with the interior chamber, and a piston disposed in the interior chamber which is reciprocally movable through upward and downward strokes therewithin, the improvement comprising the achievement of roll control in the suspension system by:

fluidly connecting the lower port of the right front shock absorber to the upper port of the left front shock absorber via the first fluid line;

fluidly connecting the lower port of the left front shock absorber to the upper port of the right front shock absorber via the second fluid line;

fluidly connecting the lower port of the right rear shock absorber to the upper port of the left rear shock absorber via a third fluid line; and fluidly connecting the lower port of the left rear shock absorber to the upper port of the right rear shock absorber via a fourth fluid line;

a first valve member which is fluidly connected to the first and second fluid lines and a second valve member which is fluidly connected to the third and fourth fluid lines, said first and second valve members being selectively actuatable between open and closed positions such that:

fluid flows between the lower port of the right front shock absorber and the upper port of the left front shock absorber, and between the lower port of the left front shock absorber and the upper port of the right front shock absorber when the first valve member is in the closed position;

fluid flows between the upper and lower ports of the right front shock absorber, and between the upper and lower ports of the left front shock absorber when the first valve member is in the open position;

fluid flows between the lower port of the right rear shock absorber and the upper port of the left rear shock absorber, and between the lower port of the left rear shock absorber and the upper port of the right rear shock absorber when the second valve member is in the closed position; and fluid flows between the upper and lower ports of the right rear shock absorber, and between the upper and lower ports of the left rear shock absorber when the second valve member is in the open position; and an acceleration sensor electrically connected to said first and second valve members and adapted to facilitate the selective actuation of the first and second valve members between the open and closed positions.

9. A vehicular suspension system having two pairs of shock absorbers including right front, left front, right rear and left rear shock absorbers, wherein each of the shock absorbers of the pair includes a housing defining top and bottom ends and a fluid filled interior chamber, upper and lower ports in communication with the interior chamber, and a piston disposed in the interior chamber which is reciprocally movable through upward and downward strokes therewithin, the improvement comprising the achievement of pitch control in the suspension system by:

fluidly connecting the lower port of the right front shock absorber to the upper port of the right rear shock absorber via the first fluid line;

fluidly connecting the lower port of the right rear shock absorber to the upper port of the right front shock absorber via the second fluid line;

fluidly connecting the lower port of the left front shock absorber to the upper port of the left rear shock absorber via a third fluid line; and fluidly connecting the lower port of the left rear shock absorber to the upper port of the left front shock absorber via a fourth fluid line;

a first valve member which is fluidly connected to the first and second fluid lines and a second valve member which is fluidly connected to the third and fourth fluid lines, said first and second valve members being selectively actuatable between open and closed positions such that:

fluid flows between the lower port of the right front shock absorber and the upper port of the right rear shock absorber, and between the lower port of the right rear shock absorber and the upper port of the right front shock absorber when the first valve member is in the closed position;

fluid flows between the upper and lower ports of the right front shock absorber, and between the upper and lower ports of the right rear shock absorber when the first valve member is in the open position;

fluid flows between the lower port of the left front shock absorber and the upper port of the left rear shock absorber, and between the lower port of the left rear shock absorber and the upper port of the left front shock absorber when the second valve member is in the closed position; and fluid flows between the upper and lower ports of the left front shock absorber, and between the upper and lower ports of the left rear shock absorber when the second valve member is in the open position; and an acceleration sensor electrically connected to said first and second valve members and adapted to facilitate the selective actuation of the first and second valve members between the open and closed positions.

10. A vehicular suspension system having two pairs of shock absorbers including right front, left front, right rear and left rear shock absorbers, wherein each of the shock absorbers of the pair includes a housing defining top and bottom ends and a fluid filled interior chamber, upper and lower ports in communication with the interior chamber, and a piston disposed in the interior chamber which is reciprocally movable through upward and downward strokes therewithin, the improvement comprising the achievement of roll and pitch control in the suspension system by:

fluidly connecting the lower port of the right front shock absorber to the upper port of the left rear shock absorber via the first fluid line;

fluidly connecting the lower port of the left rear shock absorber to the upper port of the right front shock absorber via the second fluid line;

fluidly connecting the lower port of the left front shock absorber to the upper port of the right rear shock absorber via a third fluid line; and fluidly connecting the lower port of the right rear shock absorber to the upper port of the left front shock absorber via a fourth fluid line;

a first valve member which is fluidly connected to the first and second fluid lines and a second valve member which is fluidly connected to the third and fourth fluid lines, said first and second valve members being selectively actuatable between open and closed positions such that:

fluid flows between the lower port of the right front shock absorber and the upper port of the left rear shock absorber, and between the lower port of the left rear shock absorber and the upper port of the right front shock absorber when the first valve member is in the closed position;

fluid flows between the upper and lower ports of the right front shock absorber, and between the upper and lower ports of the left rear shock absorber when the first valve member is in the open position;

fluid flows between the lower port of the left front shock absorber and the upper port of the right rear shock absorber, and between the lower port of the right rear shock absorber and the upper port of the left front shock absorber when the second valve member is in the closed position; and fluid flows between the upper and lower ports of the left front shock absorber, and between the upper and lower ports of the right rear shock absorber when the second valve member is in the open position; and an acceleration sensor electrically connected to said first and second valve members and adapted to facilitate the selective actuation of the first and second valve members between the open and closed positions.

11. In a vehicular suspension system having two pairs of shock absorbers including right front, left front, right rear and left rear shock absorbers, wherein each of the shock absorbers includes a housing defining top and bottom ends and a fluid filled interior chamber, upper and lower ports in communication with the interior chamber, and a piston disposed in the interior chamber which is reciprocally movable through upward and downward strokes therewithin, the improvement comprising the achievement of roll control in the suspension system by:

fluidly connecting the upper port of the right front shock absorber to the upper port of the right rear shock absorber via a first fluid line;

fluidly connecting the lower port of the right front shock absorber to the lower port of the right rear shock absorber via a second fluid line;

fluidly connecting the upper port of the left front shock absorber to the upper port of the left rear shock absorber via a third fluid line;

fluidly connecting the lower port of the left front shock absorber to the lower port of the left rear shock absorber via a fourth fluid line;

fluidly connecting the first, second, third and fourth fluid lines to a valve member which is selectively actuatable between open and closed positions such that:

fluid flows between the first and fourth fluid lines and between the second and third fluid lines when the valve member is in the closed position; and fluid flows between the upper and lower ports of the right front shock absorber, between the upper and lower ports of the right rear shock absorber, between the upper and lower ports of the left front shock absorber, and between the upper and lower ports of the left rear shock absorber when the valve member is in the open position; and an acceleration sensor electrically connected to said valve member and adapted to facilitate the selective activation of the valve member between the open and closed positions.

12. In a vehicular suspension system having two pairs of shock absorbers including right front, left front, right rear and left rear shock absorbers, wherein each of the shock absorbers includes a housing defining top and bottom ends and a fluid filled interior chamber, upper and lower ports in communication with the interior chamber, and a piston disposed in the interior chamber which is reciprocally movable through upward and downward strokes therewithin, the improvement comprising functionality of the suspension system in various modes of operation including an independent suspension mode, a roll control mode, a pitch control mode, and a roll and pitch control mode by:

fluidly connecting the upper and lower ports of the right front, right rear, left front and left rear shock absorbers to a valve manifold which is selectively actuatable between first, second, third and fourth positions such that:

fluid flows between the upper and lower ports of the right front shock absorber, between the upper and lower ports of the right rear shock absorber, between the upper and lower ports of the left front shock absorber, and between the upper and lower ports of the left rear shock absorber when the valve manifold is actuated to the first position;

fluid flows between the upper port of the right front shock absorber and the lower port of the left front shock absorber, between the lower port of the right front shock absorber and the upper port of the left front shock absorber, between the upper port of the right rear shock absorber and the lower port of the left rear shock absorber, and between the lower port of the right rear shock absorber and the upper port of the left rear shock absorber when the valve manifold is actuated to the second position;

fluid flows between the upper port of the right front shock absorber and the lower port of the right rear shock absorber, between the lower port of the right front shock absorber and the upper port of the right rear shock absorber, between the upper port of the left front shock absorber and the lower port of the left rear shock absorber, and between the lower port of the left front shock absorber and the upper port of the left rear shock absorber when the valve manifold is actuated to the third position; and fluid flows between the upper port of the right front shock absorber and the lower port of the left rear shock absorber, between the lower port of the right front shock absorber and the upper port of the left rear shock absorber, between the upper port of the left front shock absorber and the lower port of the right rear shock absorber, and between the lower port of the left front shock absorber and the upper port of the right rear shock absorber when the valve manifold is actuated to the fourth position.

13. The vehicular suspension system of claim 12 further comprising an acceleration sensor electrically connected to said valve manifold and adapted to facilitate the selective actuation thereof between the first, second, third and fourth positions.

14. A method for improving the performance characteristics of a vehicular suspension system having at least one pair of shock absorbers, wherein each of the shock absorbers of the pair includes a housing defining top and bottom ends and a fluid filled interior chamber, upper and lower ports in communication with the interior chamber, and a piston disposed in the interior chamber which is reciprocally movable through upward and downward strokes therewithin, the method comprising the steps of:

fluidly connecting the lower port of a first shock absorber of the pair to the upper port of a second shock absorber of the pair via a first fluid line;

fluidly connecting the lower port of the second shock absorber to the upper port of the first shock absorber via a second fluid line; connecting a fluid accumulator to each of the first and second fluid lines;

fluidly connecting a valve member to the first and second fluid lines which is selectively actuatable between open and closed positions such that:

fluid flows between the lower port of the first shock absorber and the upper port of the second shock absorber, and between the lower port of the second shock absorber and the upper port of the first shock absorber when the valve member is in the closed position; and fluid flows between the upper and lower ports of the first shock absorber, and between the upper and lower ports of the second shock absorber when the valve member is in the open position;

electrically connecting an acceleration sensor to the valve member to facilitate the selective actuation thereof between the open and closed positions.

* * * * *